(12) United States Patent
Goll (10) Patent No.: US 7,114,727 B1
(45) Date of Patent: *Oct. 3, 2006

(54) SEAL ASSEMBLY AND METHOD OF FORMING SEAL

(75) Inventor: Kevin O. Goll, Park Ridge, IL (US)

(73) Assignee: Mar Don Corporation, Park Ridge, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/035,161

(22) Filed: Jan. 13, 2005

Related U.S. Application Data (63) Continuation of application No. 10/283,225, filed on Oct. 29, 2002, now Pat. No. 6,957,817.

(51) Int. Cl.
*F16L 17/00* (2006.01)

(52) U.S. Cl. .............. 277/616; 277/603; 277/623; 277/624; 277/626; 277/627; 174/93

(58) Field of Classification Search ............ 277/917, 277/603, 607, 616, 619, 623, 624, 626, 627; 174/65 SS, 77 R, 93
See application file for complete search history.

(56) References Cited

U.S. PATENT DOCUMENTS

| | | | | |
|---|---|---|---|---|
| 3,569,608 A | * | 3/1971 | Ance ..................... | 174/93 |
| 3,655,907 A | * | 4/1972 | Philibert et al. ........ | 174/77 R |
| 4,267,401 A | * | 5/1981 | Wilkinson ............... | 174/77 R |
| 5,007,701 A | | 4/1991 | Roberts | |
| 5,048,382 A | | 9/1991 | Mitchell | |
| 5,218,664 A | * | 6/1993 | O'Neill et al. .......... | 385/135 |
| 5,290,073 A | | 3/1994 | Chen | |
| 5,313,019 A | * | 5/1994 | Brusselmans et al. ..... | 174/93 |
| 5,331,114 A | * | 7/1994 | Rudolph .................. | 174/93 |
| 5,446,823 A | * | 8/1995 | Bingham et al. .......... | 385/135 |
| 5,479,554 A | | 12/1995 | Roberts | |
| 5,545,852 A | * | 8/1996 | Boscher et al. ........... | 174/84 R |
| 5,697,194 A | | 12/1997 | Gignac et al. | |
| 5,886,300 A | * | 3/1999 | Strickler ................. | 174/135 |
| 6,245,999 B1 | * | 6/2001 | Costigan et al. ......... | 174/74 A |
| 6,627,817 B1 | * | 9/2003 | Kortenbach .............. | 174/74 R |
| 6,628,880 B1 | | 9/2003 | Roberts | |
| 6,875,926 B1 | * | 4/2005 | Buekers et al. ........... | 174/100 |
| 6,957,817 B1 | * | 10/2005 | Goll ....................... | 277/603 |
| 2004/0050583 A1 | * | 3/2004 | Denton .................... | 174/138 R |
| 2004/0080119 A1 | * | 4/2004 | Goll ....................... | 277/607 |

* cited by examiner

*Primary Examiner*—Suzanne Dino Barrett
*Assistant Examiner*—Jonathan Liu
(74) *Attorney, Agent, or Firm*—Marshall, Gerstein & Borun LLP (57) ABSTRACT

A seal assembly comprising an elastomeric gland having insert openings and fastener openings. Elastomeric inserts are removably disposed in the gland insert openings. The inserts have removable portions to form cable openings. Cable(s) can be placed in the cable openings. End plates are disposed at each end of the inserts and gland. The end plates are formed of complementary plate members, which, when mated together, form an unitized end plate having fastener openings and cable openings. Upon installing the seal assembly in an elongate container opening, fasteners, which extend through the gland and end plates, are tightened. The gland expands outward and contacts the wall forming the container opening. The gland constricts on the inserts, and, in turn, the inserts constrict on the cable(s) located in an insert.

17 Claims, 8 Drawing Sheets

SEAL ASSEMBLY AND METHOD OF FORMING SEAL

RELATED APPLICATIONS

This application is Continuation of U.S. patent application Ser. No. 10/283,225 filed Oct. 29, 2002, now U.S. Pat. No. 6,957,817, the disclosure of which is hereby incorporated by reference.

FIELD OF INVENTION

The present invention relates to an improved seal assembly that accommodates further adaptation for sealing various penetrating conduits, electrical, fiber optic, or other communication cables in a housing. The seal assembly serves to protect housing components from adverse environmental conditions while at the same time maintaining or jacketing the sealed cable(s) in the desired position free of damaging the cable splice either in initial installation, expansion, repair or normal maintenance procedures.

BACKGROUND OF THE INVENTION

Communication cables such as electrical and fiber optic cables, are often spliced or stored in duct work or an enclosure for later expansion of a network. The cables are normally jacketed in a sealed enclosure that has to be invaded in order to make the desired splice connection. Problems sometimes exist due to a poorly sealed cable assembly. Various designs have been employed to minimize adverse cable splice exposure.

One problem that sometimes occurs is that due to deterioration of various materials in a cable assembly over a period of time, a seal assembly may have to be repaired in the field. Unfortunately, various seal assemblies presently available are not particularly installer friendly. In some instances, an undesired manual operation has to be performed in the field, i.e., drilling a cable through bore in the seal assembly. Further, it has been found that when cables have been installed in the drilled bore holes and the seal assembly placed in a cable splice housing, the seal is not entirely satisfactory. A room temperature vulcanizing (RTV) material, mastic, tape or sealant has to be employed in the field at the location of the cable and corresponding bore to provide the requisite sealing and protect the cable splice from environmental exposure, i.e. dust, dirt, vermin, and moisture.

Further, it has been found that some seal assemblies are manufactured to custom fit a particular size cable. The difficulty experienced with this type seal arrangement is that a relatively large inventory of seal assemblies is required for use with different size cables. What is desired is a single seal assembly which can accommodate different size cables.

Additionally, it has been found that, in some instances, when a particular seal assembly is installed at a job site, the components of the seal assembly, when tightened during installation, do not always provide for uniform sealing throughout the seal assembly. Rather, upon tightening, the seal components generate uneven forces that sometimes produce an undesired seal assembly.

What is desired is a seal assembly which can be utilized with a housing, conduit, or cable splice assembly in which the seal assembly accommodates various size cables free of having to perform a drilling operation in the seal assembly, either at the factory or in the field.

Further, it is desired to have a cable seal assembly which, when installed, provides the desired sealing characteristics in that the cable(s) stored or spliced within cable housing is protected from adverse environmental exposures, i.e., dust, vermin, dirt and moisture.

Moreover, it is desired to have a seal assembly that is relatively installer friendly in that the seal assembly will permit various sized cables to be relatively readily utilized with the cable seal. Further, it is desired that the seal assembly be relatively easily assembled as a barrier seal and disassembled easily to accommodate cable penetration. Moreover, the seal assembly must be relatively easy to assemble or disassemble during a cable/enclosure maintenance procedure.

SUMMARY OF THE INVENTION

The invention disclosed and claimed herein serves to achieve the above-identified desires and to minimize the problems associated with prior art seal assemblies. The seal assembly of the present invention can easily accommodate different sized cables free of drilling an opening in the seal assembly for a particular size cable.

The seal assembly can be relatively easily installed into the end of a conduit or cable splice housing. It also can be relatively easily removed and reinstalled as required during a field maintenance operation.

When the seal assembly of the present invention is installed in a particular application, it is expected that the desired environmental, hermetic seal for the cable assembly will be achieved.

Briefly, the seal assembly of the present invention comprises a shaped elastomeric gland comprising an outer surface and two spaced ends. The gland has a plurality of spaced fastener openings that extend through the gland. Additionally, the gland includes recessed insert openings therein either in singular form or as a plurality of spaced openings.

A flanged elastomeric insert is adapted to be inserted in each of the gland openings so that an insert flange sits on a gland recess. The insert is a molded, extruded or die-cut elastomeric member having a plurality of spaced concentric rings processed into the insert for substantially the entire thickness of the insert. The rings are cut or slit entirely about their respective circumference as disclosed and claimed in U.S. Pat. No. 5,048,382, the entire disclosure and claims of which are incorporated herein by reference. An offset radial slit extends outward from the center of the processed rings to the insert perimeter.

A substantially rigid end plate is located adjacent each end of the gland. The end plates each include at least two complementary end plate members, that are mated together to form a unitized end plate that abuts a gland end. Each end plate preferably is formed of a suitable material that will not significantly deteriorate over time, e.g., an alloy of molded polyvinyl chloride (PVC). The complementary plate members obviate the need for large tooling. When the members are mated to form an unitized end plate, a plurality of spaced openings are formed in the plate. These plate openings are designed to align with insert and bolt or fastener openings in the gland. A plurality of fasteners is employed to hold the end plates against the ends of the gland.

The seal assembly is adapted to be inserted in one or both ends of a conduit, storage device, or cable splice housing. Initially, an installer can determine the cable size to be employed in a particular application. The inserts can be pulled apart at the location of the radial slit and a requisite number of insert portions removed from a particular insert. Cables are placed in the pared inserts. The inserts and cables then are replaced in the gland insert openings. A unitized end plate formed by complementary end plate members abuts each end of the gland. Fasteners are inserted through aligned openings in the end plate members and gland. The seal assembly is suitably placed within the desired aperture of the cable splice housing or container. Fastener nuts are tightened to draw the end plates against the gland ends, the effect of which is to sandwich or compress the gland between the end plates causing the elastomeric gland to move outward in a sealing engagement with the inner wall of the housing or container that forms the aperture. Tightening of the fasteners also causes the gland to constrict against the insert(s). When cable(s) are disposed within one or more insert(s), the pared inserts further constrict against the cable(s).

Further advantages of the invention will become apparent from the following description of the drawings and detailed description of the invention.

DETAILED DESCRIPTION

Figure 1:
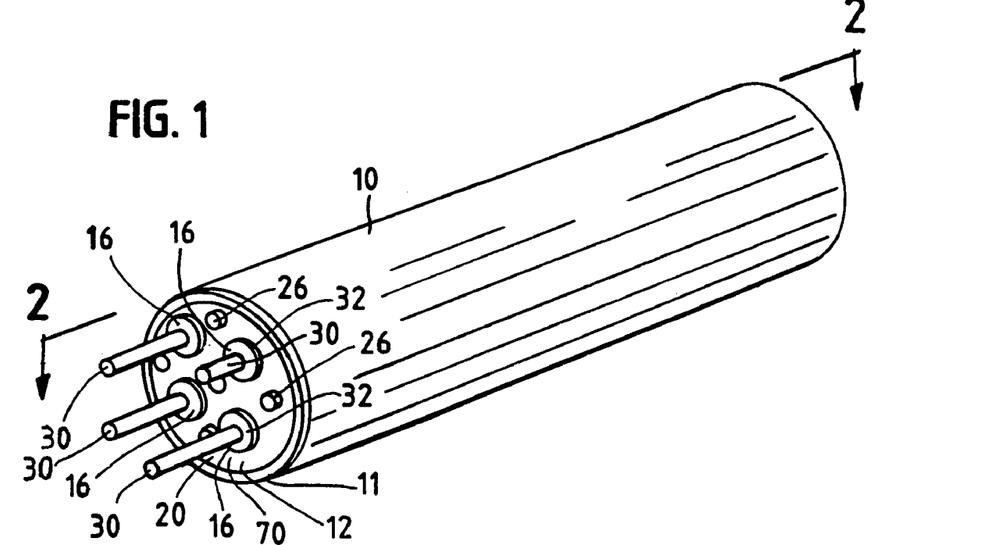
FIG. 1 shows a partial perspective view of a conduit or cable splice housing and a seal assembly of the present invention inserted at one of the housing ends with a plurality of cables disposed within the seal assembly.
Figure 2:
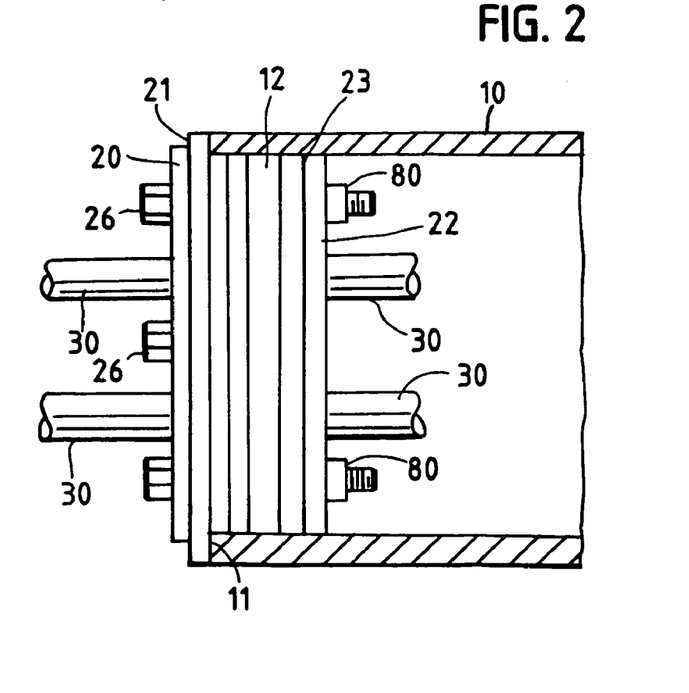
FIG. 2 shows an enlarged fragmentary cross-sectional view of the seal assembly disposed in the cable splice closure housing taken along lines 2—2 in FIG. 1.

Referring to the drawings, FIGS. 1 and 2 illustrate a conduit or splice closure assembly housing 10. A cap in the form of seal assembly 12 is shown inserted in one end 11 of housing 10. Seal assembly 12 includes a flanged elastomeric gland 14. A plurality of elastomeric inserts 16 are disposed in openings 18 in gland 14. Plate 20 abuts one end 21 of gland 14 while plate 22 abuts the remaining end 23 of gland 14. Fasteners such as compression bolts 26 and nuts 80 are utilized to fasten plates 20, 22 against gland 14. Cables 30 are positioned within inserts 16 and the inserts are disposed within spaced openings 18 in gland 14.

Gland 14 may be fabricated from any suitable natural or synthetic material which has the required characteristics of being generally elastic and resilient and sealing about the various surrounding components when squeezed or compressed. One material that can be utilized is ethylene propylene diene monomer (EPDM) having a 30 to 50 Shore A durometer and preferably a durometer of about 40 to 45 Shore A. Other elastomeric materials could be employed that are apparent to a person of ordinary skill in the art depending upon a particular application.

Figure 3:
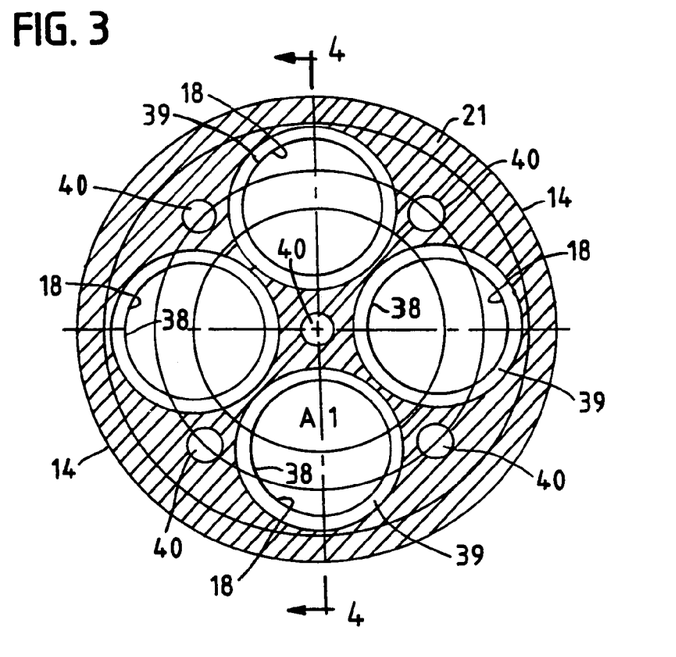
FIG. 3 shows an end view of the elastomeric sealing gland of the seal assembly of the present invention.
Figure 4:
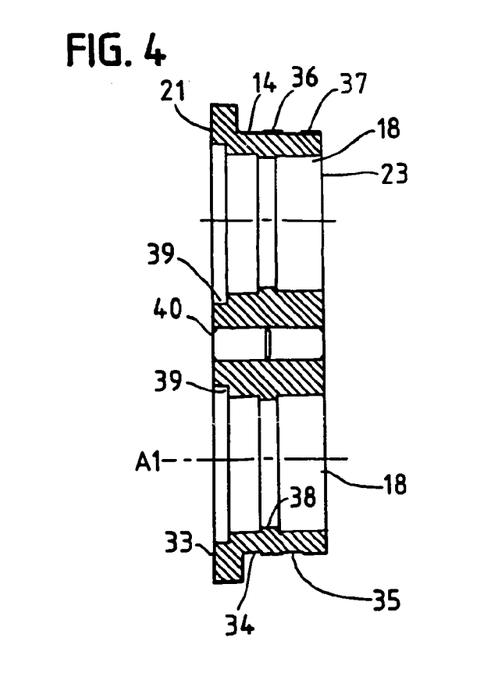
FIG. 4 shows a side section view of the sealing gland taken along lines 4—4 in FIG. 3.

As seen in FIGS. 3–4, gland 14 in one illustrative embodiment is cylindrically shaped and includes flange 33 at end 21. Gland 14 is also recessed at spaced locations 34, 35 on the outer radial surface to provide a plurality of spaced compression ribs 36, 37.

A plurality of spaced insert openings 18 extend along the length of gland 14. Recess 39 is formed in gland end 21 at the location of and surrounding each insert opening 18. Opening 18 preferably tapers slightly inwardly from the location of recess 39 to gland end 23. A taper of about 4–6 degrees has been found satisfactory. If desired, rib 38 can be formed in the wall that forms opening 18 mediate the gland ends.

A plurality of spaced bolt or fastener holes 40 extend along the length of gland 14. In the event that gland 14 is molded, it is preferred that a thin skin or membrane of approximately 0.03 inch be formed in each of the bolt holes. When a fastener is inserted through hole or opening 40, the fastener will puncture the skin or membrane and press through the entire length of the gland. In some applications, it is preferred not to employ a fastener at each opening 40 in which case it will not be necessary to rupture the membrane located within a particular opening.

Figure 5:
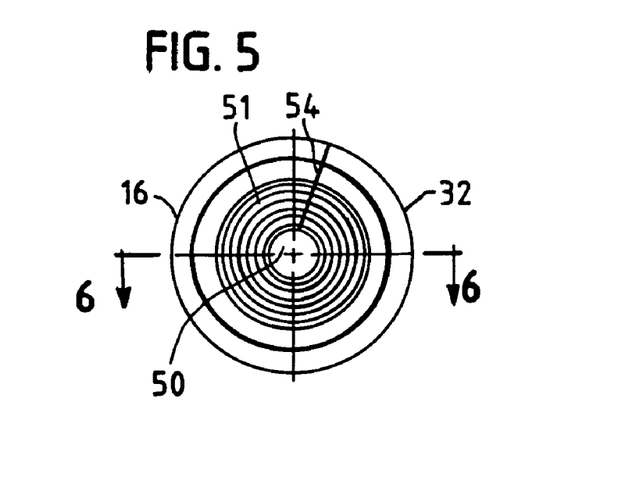
FIG. 5 shows an end view of an elastomeric gland insert employed in the seal assembly of the present invention.
Figure 6:
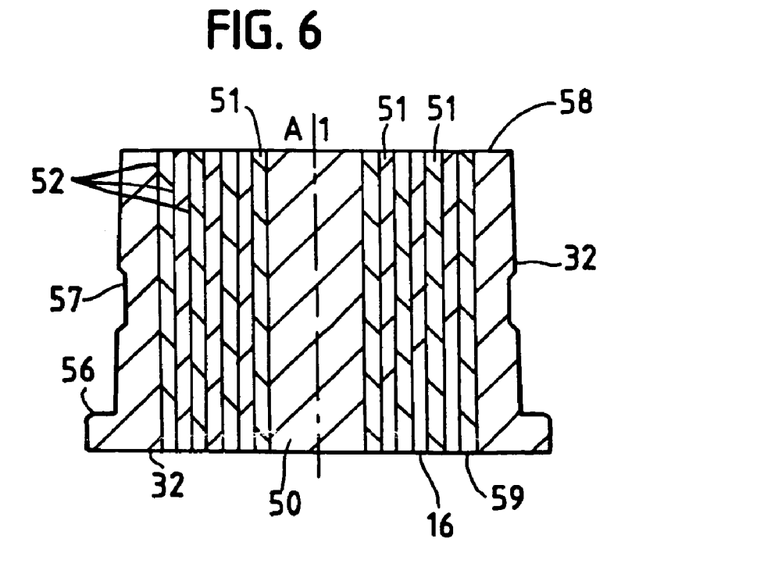
FIG. 6 shows a plan section view of the gland insert taken along lines 6—6 in FIG. 5.
Figure 11:
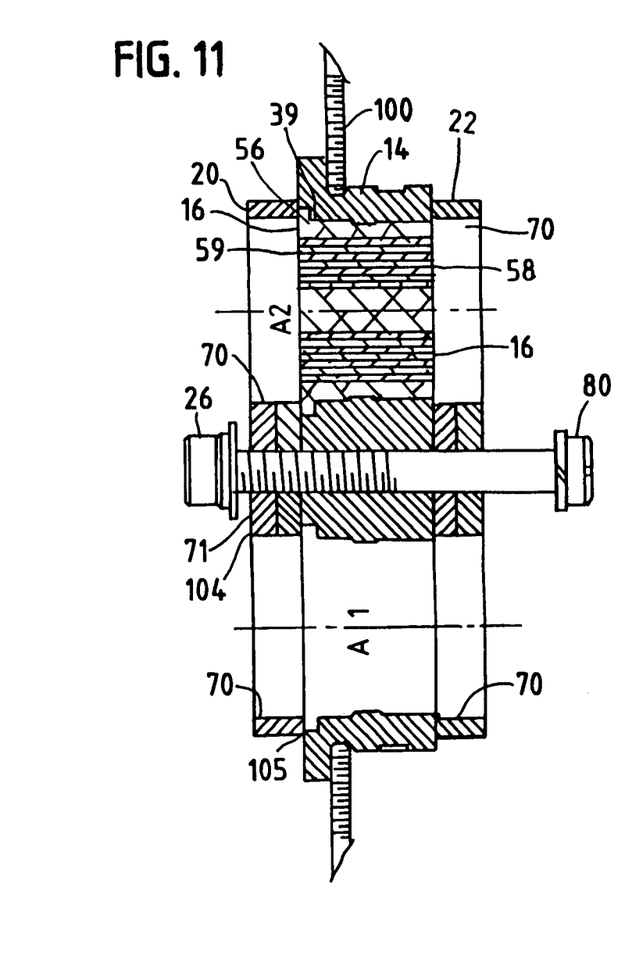
FIG. 11 shows a side section view of the cable seal assembly of the present invention taken along lines 11—11 in FIG. 10 with the gland contained in a bulkhead.

Turning to FIGS. 5 and 6, insert 16 includes a molded or fabricated elastomeric member. Insert 16 is made of a 55–70 Shore A durometer EPDM material and most preferably a durometer of about 60 Shore A. Insert 16 is shown in this embodiment as including removable plug portion 50 and a plurality of concentric rings 51, each ring portion being formed by a pair of concentric spaced slits 52. Slits 52 extend along substantially the entire length of the insert. Preferably, slits 52 do not extend the entire length of an insert but rather a thin membrane of about 0.03 inches remains at one end of the insert that serves to hold the ring portions together. A second radial insert slit 54 extends outwardly from the center axis of the insert to outer gland surface 32 with the slit extending substantially along the entire length of the insert. Radial slit 54 is offset about 7 degrees to the longitudinal axis of insert 16. If desired, a plurality of second radial gland slits can be employed As seen in FIGS. 6 and 11, insert 16 includes flange 56 located at one insert end 59. Flange 56 is adapted to seat in gland recess 39 surrounding an opening 18. Additionally, insert 16 is recessed at 57 to communicate with rib 38 and is tapered inwardly a small amount in the range of about 4–6 degrees extending from the bottom of flange 56 to insert end 58.

Figure 7:
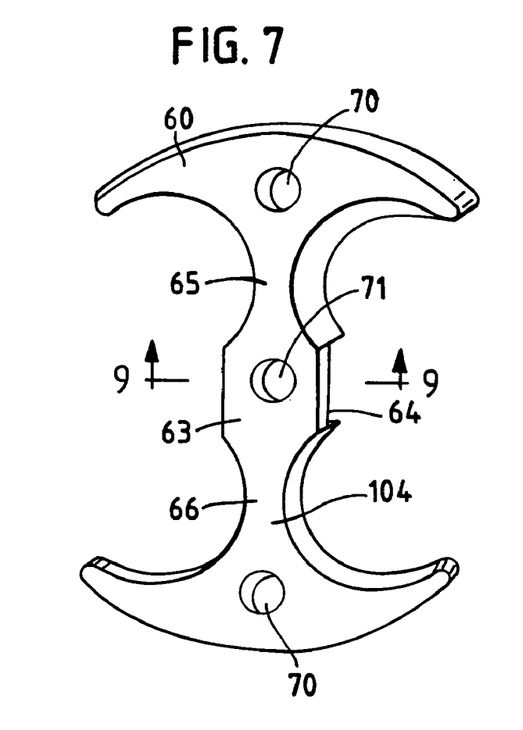
FIG. 7 shows a perspective view of an end plate member utilized in one embodiment of the present invention.
Figure 8:
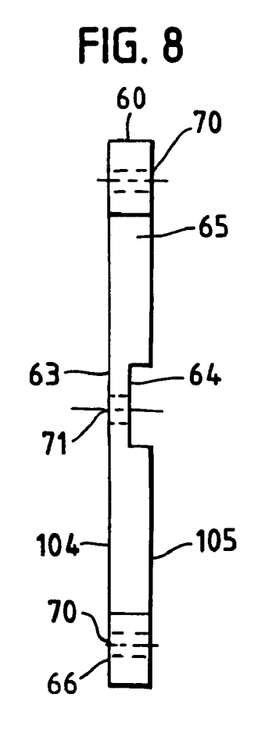
FIG. 8 shows a side view of an end plate member of FIG. 7.
Figure 9:
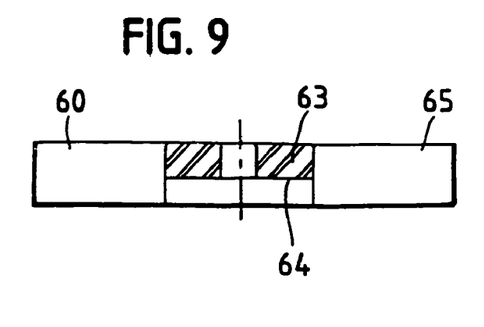
FIG. 9 shows a section view of the end plate member taken lines 9—9 in FIG. 7.
Figure 10:
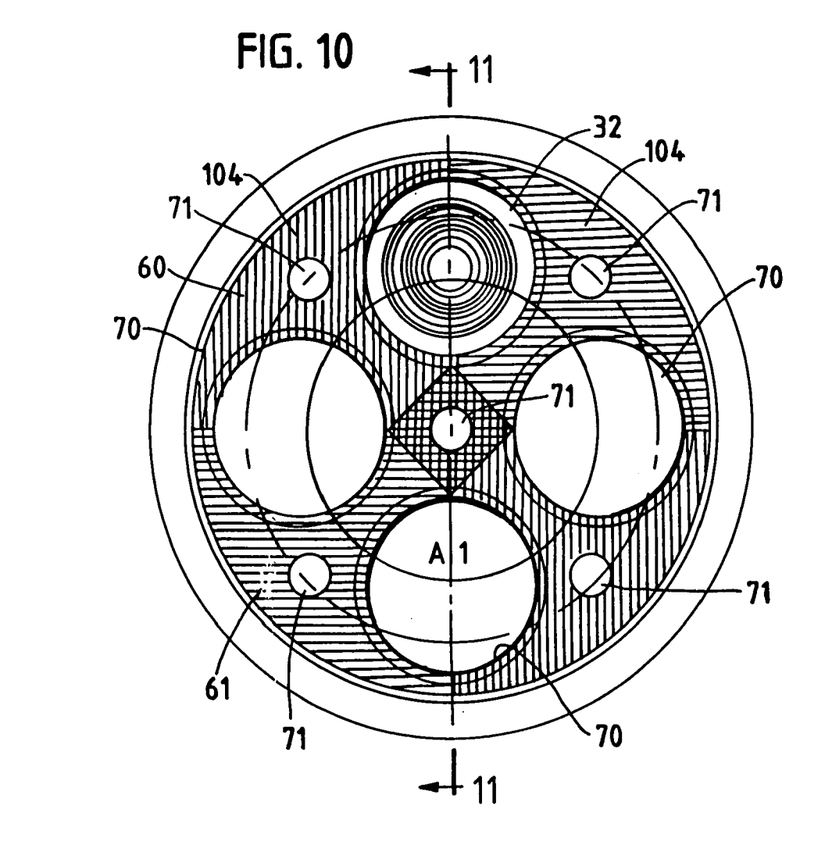
FIG. 10 shows an end view of the seal assembly of the present invention including a gland and two abutting unitized end plates, the unitized end plates each being formed of two complementary end plate members.

FIGS. 7–11 show unitized end plates 20, 22. Each plate is formed of two substantially identical complementary members 60, 61. Turning to FIGS. 7–9, member 60 includes a segment 63 which is recessed at 64. One end of segment 63 terminates as an end of a plate face 65, while the remaining end of segment 63 terminates as an end of plate face 66.

Plate member 61 is identical to plate member 60. Plate member 60 and plate member 61 are aligned along their respective longitudinal axes with their respective recess 64 facing each other. Upon turning of one plate member relative to the other plate member, the plate member will seat within one another at the location of the plate member recesses to form a unitized end plate 20, 22. Each outboard end of each plate member 60 will be contiguous to an outboard end of plate member 61. Each unitized end plate 20, 22, when formed from a pair of plate members 60,61, includes a plurality of cable openings 70 and fastener openings 71.

Upon assembly at an application site, if penetration of the seal is desired, the size of the cable or cables is measured. Plug portion 50 and the requisite number of ring portions 51 are removed from the required number of inserts 16. A cable is inserted into a pared insert 16. Each insert and cable is inserted into an insert opening 18 in gland 14 with the insert flange 56 seated in gland recess 39.

The complementary plate members 60, 61 of the unitized end plates 20 and 22 are assembled and fasteners, such as compressive bolts 26, are inserted through bolt openings 71 in end plates 20, 22 and aligned openings 40 in gland 14.

The unitized system of end members 60, 61 to form end plates 20, 22 with their substantially plane unitized surfaces 104, 105 offers a platform for secure attachment of additional strain relief devices by fasteners 26, 80 at holes 40. A proper strain relief provides for the restriction of torsional and lateral movement that is coincident to the axis of any penetrating cable located within an insert 16.

The seal assembly is inserted in housing 10 and seal assembly fasteners such as compression bolts 26 and nuts 80 are tightened. As the bolts and nuts are drawn together, unitized end plates 20, 22 sandwich or compress gland 14. As gland 14 compresses, the outer surface of the gland is forced against the inner wall surface of rigid housing 10 while the inserts 16 constrict about the cables 30.

If maintenance is required, bolt/nut assembly 26, 80 is loosened to a point where the recess 64 of plate member 60 is withdrawn from the recess 64 in plate member 61. The plate members then can be turned relative to one another sufficient to at least allow removal of an insert 16 from a gland opening 18. The inserts can be withdrawn as needed for initial cable penetration, cable upgrade or insert replacement. Face plate members 60, 61 then are rotated 90° or until the plate members can seat within one another whereupon bolt/nut assembly 26, 80 can be tightened and seal assembly 12 replaced into a sealing position.

Plate openings 70 in each end plate may be of the same size. FIG. 11 illustrates unitized end plates 20, 22 having openings 70 of the same diameter. Additionally, as shown in FIG. 11, each opening 70 in end plate 20 is preferably of a diameter that is less than the diameter of insert flange 56. Accordingly, when the seal is assembled, a portion of unitized end plate 20 will contact the flanged ends 59 of inserts 16 thereby precluding the inserts from moving outward in the direction of end plate 20. As shown in FIG. 11, however, unitized end plate 22 seats against gland 14 at the non-flanged end 58 of insert 16. It will be observed that openings 70 in unitized end plate 22 are larger in diameter than the diameter of insert ends 58 so that inserts 16 are not restricted from outward movement along the longitudinal axis of the inserts in the direction of unitized end plate 22.

Upon seal assembly, as fasteners 26 and 80 are tightened and unitized end plates 20, 22 are drawn together against gland 14, the elastomeric gland will expand outwardly against a housing or container surface in which the seal assembly is seated. The gland will also constrict against inserts 16. Inserts 16, in turn, if pared for penetration, will constrict against the cable or cables in a particular insert. Additionally, while an insert 16 is precluded from moving outward in the direction of end plate 20, the insert is permitted to move slightly outward in the direction of end plate 22. This arrangement permits insert 16 to constrict against one or more cables disposed in an insert to form a desired sealing relationship between a cable and insert 16.

If desired, one of the end plates could be threaded so that no nut 80 is required. Instead, the bolt 26 would thread directly into an end plate.

While a cylindrical configuration is generally preferred for a housing, it is appreciated that other configurations are readily conceivable to a person of ordinary skill in the art which could be utilized if desired without departure from the present invention.

Similarly, while each unitized end plate 20, 22 has been illustrated as being formed of two complementary components, it is appreciated that the end plates would be formed of more than two complementary members depending upon a particular application.

The embodiment illustrated in FIGS. 1 and 2 shows the use of the seal assembly of the present invention within a conduit or cable splice housing whereas FIG. 11 shows the seal assembly located within an opening in bulkhead 100. It is appreciated that the seal assembly could be utilized in other applications in which cables were disposed within one or more seal assembly inserts and the seal assembly disposed in an elongate aperture or opening of a container, bulkhead, tubing, conduit or innerduct having at least one end opening therein. Accordingly, the term "container" as used herein is intended in a broad sense and includes various structures in which the seal assembly of the present invention can be installed to hold cable or tubing and perform a sealing function.

Similarly, while the present invention has been illustrated with a seal assembly used for installation in a cable transmission housing assembly, it is appreciated the seal assembly of the present invention could be used in other applications such as for conduit, innerduct, electrical and fluid transmission seals.

Figure 12:
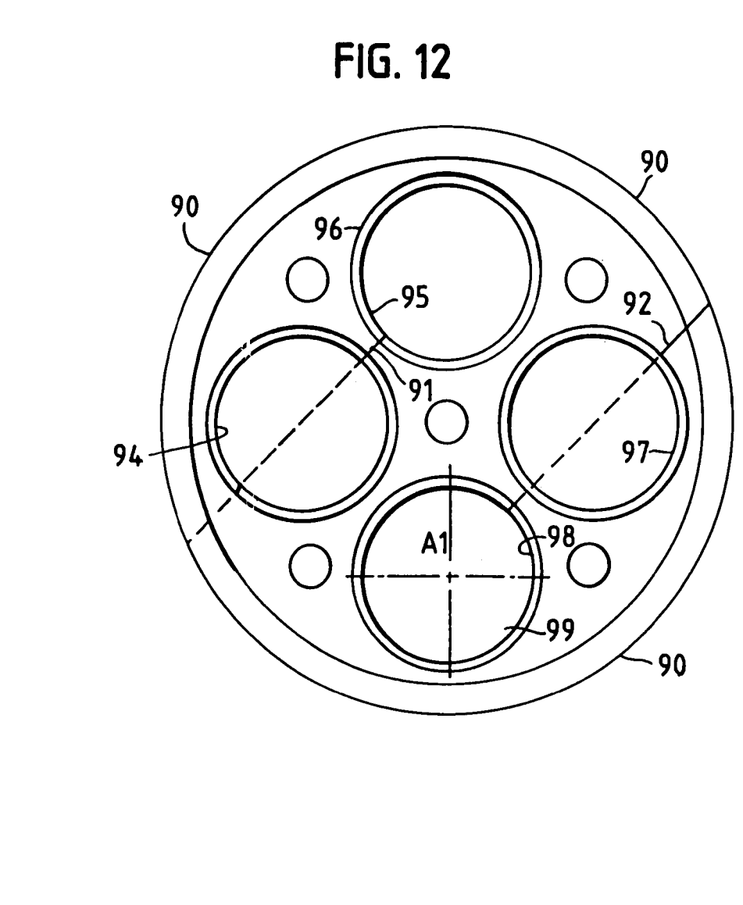
FIG. 12 shows an elastomeric gland of the present invention having a plurality of traverse slits perpendicular to the longitudinal axis of the insert.
Figure 13:
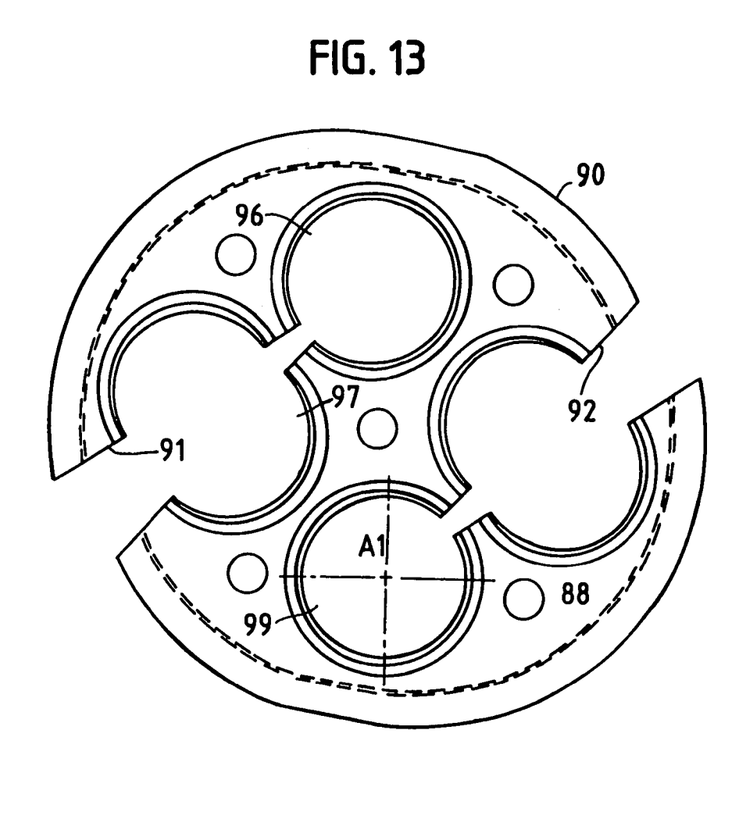
FIG. 13 shows the gland of FIG. 12 in an expanded position adapted to receive cable(s) and insert(s)

FIGS. 12 and 13 show another gland embodiment 90. In this particular embodiment, gland 90 is substantially identical to gland 14 except that gland 90 has a plurality of slits 91, 92. First gland slit 91 extends inwardly from outer gland surface 93, across insert opening 94 to gland surface 95 that surrounds opening 96. A second gland slit 92 also extends from the outer surface 93, across insert opening 97 to gland surface 98 that surrounds insert opening 99. Both slits 91, 92 can be made to extend along the entire length of gland 90. In a particular application, elastomeric gland 90, as seen in FIG. 13, can be manually separated, as required, at gland slit 91 and/or 92 in order that one or more cables and inserts 16 be inserted in a gland.

Figure 14:
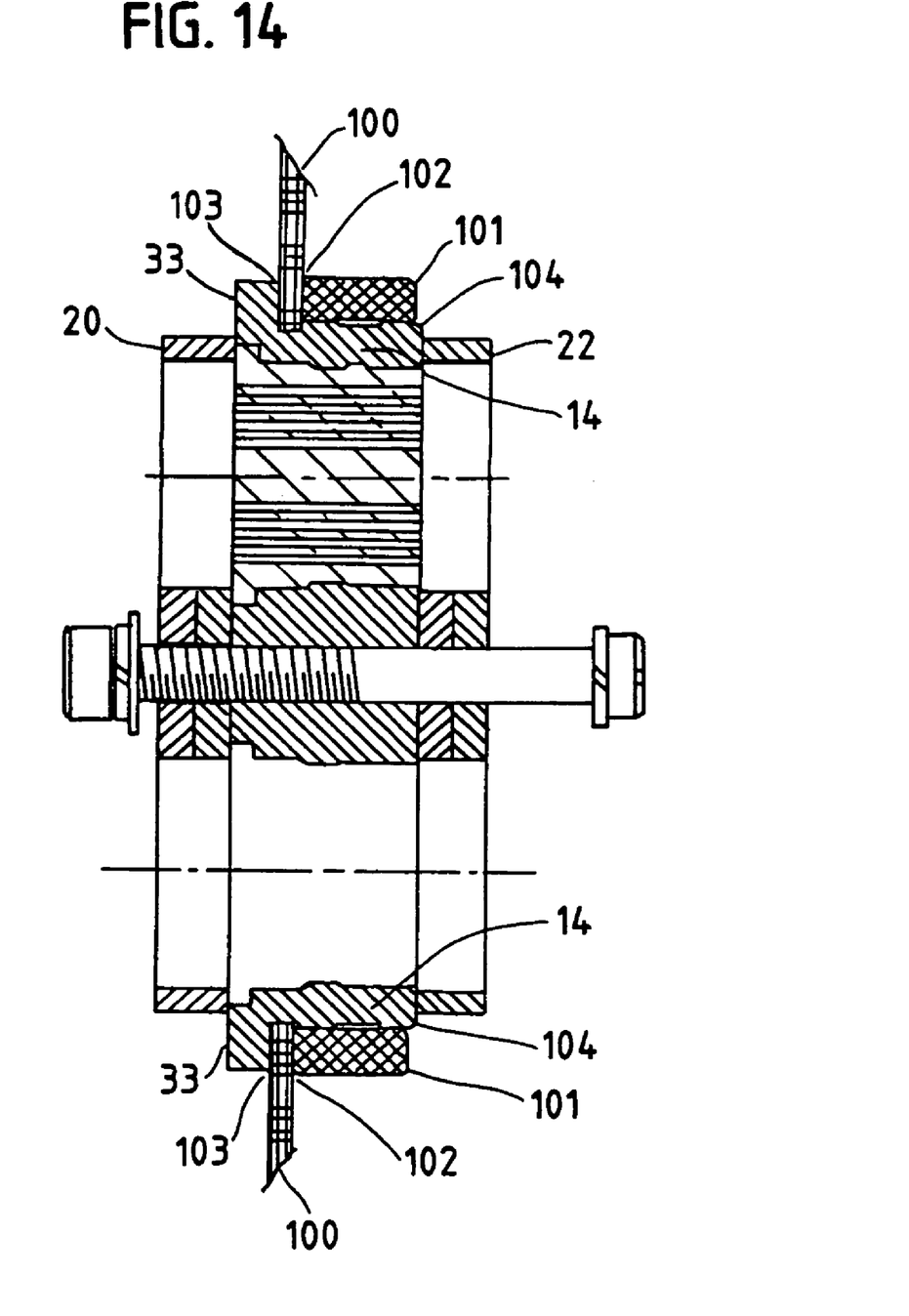
FIG. 14 shows the cable assembly illustrated in FIG. 11 and further includes a back up member which seats over the outer gland surface; and, FIG. 15 shows a further embodiment of the present invention in which a dual seal assembly formed by the seal assembly of the present invention is employed in a cable sealing application.

In some instances, when seal assembly 12 is to be employed in bulkhead 100, FIG. 14, it may be desirable to employ a back up ring or member 101 made of a plastic derivative such as an alloy of polyvinyl chloride (PVC) or other suitable material. Ring 101 slides over the outer surface of gland 14 and abuts against side 102 of bulkhead 100. The remaining side of bulkhead 100 abuts against the bottom 103 of gland flange 33. Ring 101 has a length which is substantially equal to the length of gland 14 extending from bulkhead side 102 to the opposite gland end 104. If desired, backup ring 101 can be made of one piece or it can be formed of two or more components. In installation, upon compression of the end plates 20, 22 of seal assembly 12, gland ribs 36, 37 grip against the inner wall surface of back up ring 101 thereby keeping the back up ring in place against bulkhead 100.

Figure 15:
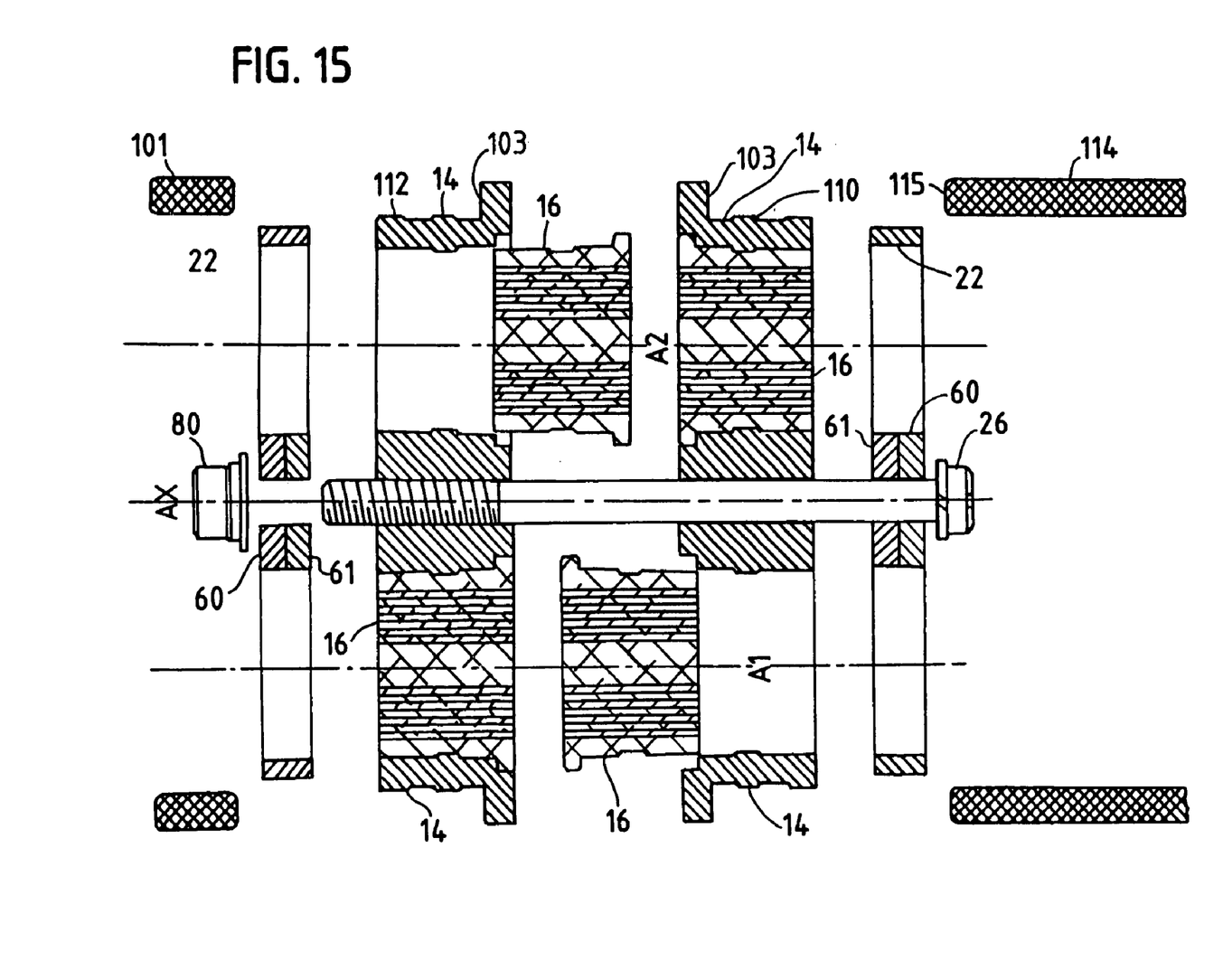

FIG. 15 shows a further embodiment of the present invention. In this particular application a dual seal assembly is employed to provide the requisite sealing. Two seal assemblies are employed in the installation. Specifically, a first seal assembly 110 includes a gland 14, a plurality of inserts 16 and one unitized end plate 22 formed by plate members 60, 61. The second seal assembly 112 also includes a gland 14, inserts 16 and one unitized end plate members 60, 61. Cables can be placed in the inserts 16 of each seal assembly.

Seal assembly 110 is adapted to be disposed within container housing 114 so that the container end surface abuts gland flange bottom 103. A back up ring 101 slides over the outer surface of gland 14 in seal assembly 112.

A fastener comprising one or more bolts 26 are inserted through fastener openings 40 in the glands of seal assemblies 110, 112. A fastener nut 80 is fastened to each end of the bolts 26. It will be observed that the fasteners 26 are of a length which permit the fasteners to extend along the entire length of the fastener openings in the gland of seal assembly 110 and the gland of assembly 112 as well as the end plates 22.

The seal assembly 110 is sandwiched against seal assembly 112 so that both the flanged ends of glands 14 and inserts 16 abut one another. A unitized end plate 22 is located at each remaining gland end. When fastener assemblies 26, 80 are drawn together, the glands 14 will compress. Gland 14 of assembly 112 will compress against the inner wall surface of back up ring 101 and constrict the inserts and cables in that seal assembly. Similarly, gland 14 of seal assembly 110 will compress against the inner wall surface of container 114 and constrict the inserts and cable located within the inserts of seal assembly 110.

While one or more embodiments of the invention have been illustrated and described in detail, it will be understood that modifications and variations thereof may be effected without departing from the spirit and the scope of the appended claims.

The invention claimed is:

1. A seal assembly for sealing cables in an elongate container opening, said assembly comprising:
    an elastomeric gland having a length, an outer surface and two spaced ends and adapted to be inserted in said container opening, said gland having a plurality of spaced insert openings and spaced fastener openings;
    an elastomeric insert releasably disposed in each of said insert openings;
    each insert comprising a shaped member having a length and a plurality of removable portions;
    a pair of substantially rigid end plates, each end plate having a plurality of spaced fastener openings and a plurality of spaced cable openings in which at least one end plate is formed of a plurality of complementary members, which when said members are mated, form a unitized end plate; and,
    a plurality of releasable fasteners, each fastener being adapted to be inserted through a fastener opening in said end plates and gland, whereupon, in assembly, one of said end plates is disposed adjacent one end of said gland and inserts.

2. A seal assembly in accordance with claim 1 in which each of said insert removable portions is formed by a plurality of first slits extending in one direction along the substantial length of said insert.

3. A seal assembly in accordance with claim 2 in which each of said inserts includes a second slit extending in a second direction traversing said first slits.

4. A seal assembly in accordance with claim 2 in which each end plate is formed of two plate members.

5. A seal assembly in accordance with claim 1 in which said elastomeric gland is formed of a material having a first durometer and said inserts are each formed of a material having a second durometer.

6. A seal assembly in accordance with claim 5 in which said gland durometer is lower than the durometer of said insert material.

7. A seal assembly in accordance with claim 1 in which said gland has a recess at one end surrounding each of said gland insert openings and said inserts each have a flange at one insert end whereupon assembly of said seal assembly, each insert flange seats in a gland recess.

8. A seal assembly in accordance with claim 7 in which said inserts are each tapered along said insert length, said taper extending inwardly from said flanged insert end.

9. A seal assembly in accordance with claim 8 in which, upon assembly, one of said plates located adjacent said flanged ends of said inserts contacts said inserts disposed in said gland.

10. A seal assembly in accordance with claim 9 in which said remaining end plate, upon seal assembly, is substantially free of contact with said inserts disposed in said gland.

11. A dual seal assembly for sealing cables in an elongate container, said dual seal assembly comprising:
    a first and second seal assembly, each of said seal assemblies comprising an elastomeric gland having a length, an outer surface and two spaced ends, said gland having a plurality of spaced insert openings and spaced fastener openings;
    an elastomeric insert releasably disposed in each of said insert openings;
    each insert comprising a shaped member having a length and a plurality of removable portions;
    a substantially rigid end plate having a plurality of spaced fastener openings and a plurality of spaced cable openings in which said end plate is formed of a plurality of complementary members, which when said members are mated, form a unitized end plate;
    at least one releasable fastener assembly;
    said seal assemblies being positioned relative to each other whereby said glands of each seal assembly abut one another at one gland end and an end plate is located at the remaining gland end of each seal assembly; and,
    said fastener assembly extending through one of said fastener openings in each seal assembly gland and end plate, said fastener assembly being adapted to compress against said end plates.

12. The dual seal assembly of claim 11 and including a plurality of fastener assemblies, each of said fastener assemblies extending through one of said fastener openings in each seal assembly gland and end plate.

13. A dual seal assembly in accordance with claim 11 in which each gland is flanged at one end and includes a recess in each of said gland insert openings; and each of said inserts in flanged at one end whereby said flanged insert is adapted to seat in a gland recess.

14. A dual seal assembly in accordance with claim 13 in which said glands of said seal assemblies abut one another at the flanged ends of said glands.

15. A dual seal assembly in accordance with claim 11 and further including a back up member adapted to seat on the outer gland surface of one of said seal assemblies and the outer gland surface of said remaining gland being adapted to contact said container.

16. The method of forming a cable seal assembly in a container having a elongate container opening with a seal assembly comprising a shaped elastomeric gland having an outer surface, a length and two spaced ends, said gland including at least one insert opening and a plurality of spaced fastener openings; an elastomeric insert comprising a shaped member having a length and a plurality of removable portions extending along the length of said insert; a pair of spaced substantially rigid end plates in which at least one end plate is formed of a plurality of complementary members, which when said members are mated, form a unitized end plate, each end plate having a plurality of spaced fastener openings and at least one cable opening; at least one releasable fastener, said method comprising the steps of:

removing at least one of said removable portions from said insert to form an insert opening;

inserting a cable in said insert opening;

inserting said insert and cable in said gland insert opening;

placing an end plate adjacent each end of said gland and aligning said gland fastener openings with said end plate fastener openings;

inserting a fastener in said fastener opening in said gland and end plates;

inserting said assembly in said container opening; and closing said fastener to draw said end plates against said gland and insert to cause said gland to expand in said container opening and constrict on said insert and said insert to constrict on said cable.

17. The method of claim 15 and further including the placing a back up member over the outer surface of said gland prior to closing said fastener.

* * * * *